| | JOURNAL | | | |
|---|---|---|---|---|
| PICK-UP | CHECKS | DEPOSIT | BALANCE | |
| I   90.00+ + | 25.00-   250.00-   250.00+RT | | JUN 17'55             65.00* | |
| 4420 | | | | |

INVENTORS.
BYRON A. RUNDE.
BY IRVIN W. BORUTZKE.

ATTORNEY.

3,083,900
CONTROL APPARATUS FOR ACCOUNTING MACHINES

Byron A. Runde, Farmington, and Irvin W. Borutzke, Detroit, Mich., assignors to Burroughs Corporation, Detroit, Mich., a corporation of Michigan
Application Jan. 30, 1957, Ser. No. 637,281, now Patent No. 3,023,951, dated Mar. 6, 1962, which is a division of application Ser. No. 522,430, July 18, 1955, now Patent No. 3,021,053, dated Feb. 13, 1962. Divided and this application June 2, 1961, Ser. No. 114,550
3 Claims. (Cl. 235—60.49)

This invention relates to improvements in accounting machines and is concerned more particularly with improvements in the control of machine operation by the totalizer in cooperation with the carriage and/or selected ones of the keys.

In some kinds of accounting or bookkeeping work, such for example as the posting of checking accounts in banks, it is desired that the accounting machine provide a warning to the operator when an overdraft or negative balance is present in the totalizer immediately following the posting of checks. Such a warning may direct the operator's attention to a situation which might pass unnoticed if the operator were permitted to proceed with the posting of deposits without such warning. In particular it may serve to apprise the operator of attempted perpetration of certain objectionable commercial practices which are described in detail below. In accordance with one embodiment of the invention such a warning is provided in the form of a restraint upon operation of the machine when the operator causes tabulation of the carriage to a deposit column after the posting of checks which produce a negative balance in the totalizer. The resulting failure of the machine to operate under the influence of the conventional controls apprises the operator that there is a negative balance in the totalizer.

It is another object of the present invention to provide an improved control of machine operation whereby cycling of the machine by actuation of the usual manipulative means is prevented when the carriage is in certain predetermined keyboard amount entry columnar positions and there is a negative balance in the totalizer.

The foregoing and other features of the invention are hereinafter more particularly described with reference to the accompanying drawings in which.

General

Figure 1:
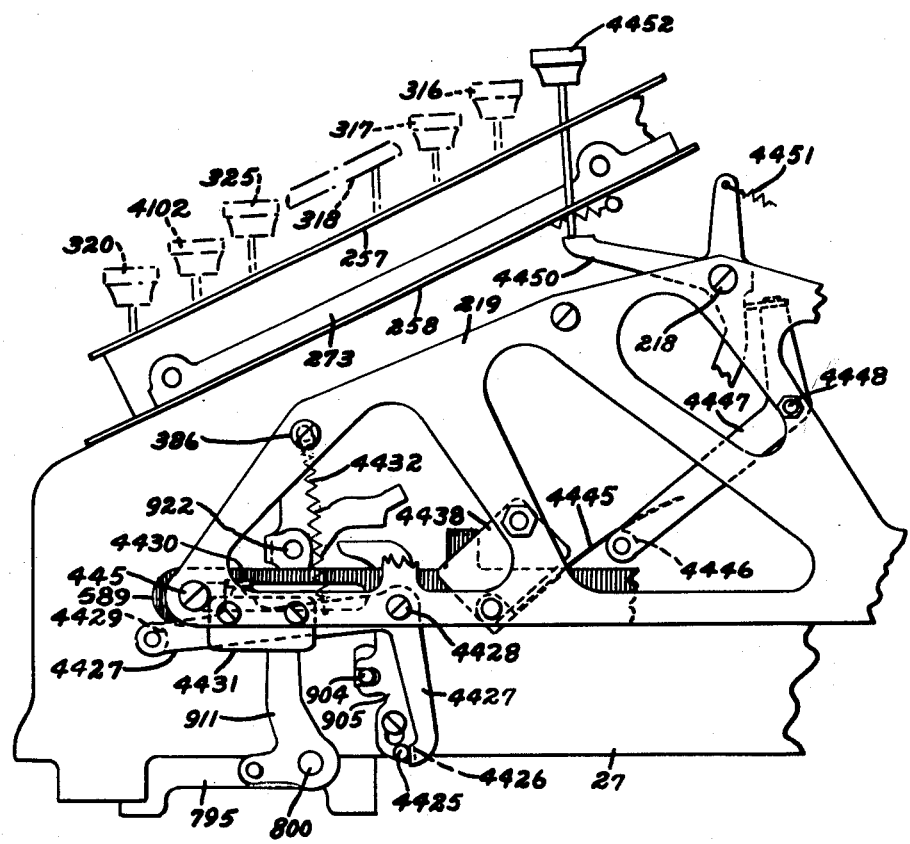
FIG. 1 is a right side elevation of portions of an overdraft warning means.

The invention is herein disclosed as embodied, by way of example, in an accounting machine constructed as disclosed in Patent No. 2,629,549 issued Feb. 24, 1953 to Thomas M. Butler with the modifications disclosed in application Serial No. 242,623, now Patent No. 2,807,412, filed Aug. 20, 1951 by Byron A. Runde and with further modifications disclosed in application Serial No. 522,430, now Patent No. 3,021,053, and application Serial No. 637,281, now Patent No. 3,023,951 which was a division of application Serial No. 522,430. The present application is a division of the above-mentioned application Serial No. 637,281. The above four cases are referred to subsequently herein as the Butler patent, the Runde application, and the parent application, and the divisional application.

Those elements of the illustrated machine which are disclosed in prior patents or applications are designated in the following description and accompanying drawings by the same reference numbers by which they are identified in such prior patents and applications. Reference numbers in parentheses identify elements disclosed in the Butler patent or in the above Runde application but not shown in the annexed drawings or in the drawings of the parent application. Mechanisms, parts and elements newly disclosed in the parent application are designated by reference numbers above 4100.

Consistently with the descriptions in the above-mentioned Butler patent and Runde application, the terms "clockwise" and "counterclockwise" will be applied to rotary or swinging movements of parts as viewed from the front, top, or right side of the machine, and the terms "forward," "rearward," "rightward," "leftward," "upward" and "downward" will be applied to movements or positions of the parts as viewed normally from the front of the machine.

The manual and automatic function controls of the machine are like those of the Butler patent modified as disclosed in the Runde application and further modified as described in detail in the parent application and hereinafter.

Overdraft Warning Means

In certain kinds of accounting work, such as checking-account posting in banks, it is desirable to bring to the attention of the machine operator a certain type of overdraft condition which would not be brought to the operator's attention by the negative total lock disclosed and claimed in the above-identified divisional application. For example, the operator might post a check which is for an amount very substantially larger than the old balance resulting from the last previous posting to the same account. The operator may also have for posting to the same account, a deposit of an amount equal to or greater than the difference between the old balance pick-up and the posted check so that as the paper carriage arrived in the new balance position after the deposit entering operation, the crossfooter or adding and subtracting balance totalizer would contain either a zero balance or a positive balance, so that the automatic new balance operation in the new balance column would not be prevented by the negative total lock disclosed and claimed in the above-identified divisional application. The deposit involved in such a posting may be of any one of a number of varieties, some of which would not warrant return of the posted check, but others of which would, under the bank's rules applicable to checking accounts, warrant refusal to honor the check drawn on the account until after the bank had collected the deposit item or items. For example, the deposit item might be currency deposited with the receiving teller in an amount adequate to cover the drawn check, which should therefore be honored and paid. In another instance, the deposit item might be a check drawn by someone not personally known at the bank upon another bank in the same or in a different city, so that the collectibility of the deposit item may be uncertain, or, even if it is eventually collectible it might involve an improper practice which banks will not knowingly permit. For example, one person may have checking accounts under different names in two or more banks, each account having a small balance. Such person may, when temporarily pressed for funds, draw a check on the account in one bank in an amount substantially overdrawing that account and at the same time draw a check on an account in a second bank for deposit to the account in the first bank, but also overdrawing the account in the second bank. If the first check were honored by the bank on which it was drawn, the customer would have the use of the bank's money during the delay involved in collection of the second check and might find it possible to obtain funds to deposit in the second bank to cover the check drawn on the second bank before the latter check was received by the second bank. Such practice is objectionable to banks for several reasons, and their checking account rules do not permit it, not only because the practice involves the use of the first bank's money during the period required to collect the check deposited therein from the second bank, but the deposited check could actually be a piece of fictitious commercial paper which represents a non-existent balance or no true deposit in the second bank. In the latter case, the practice may be a deliberate perpetration of a fraud upon the bank known as "check kiting." Therefore, when a check drawn on an account overdraws the balance in that account but is received immediately after receipt of a deposit item which would cover the overdraft but requires collection, the overdraft should be called to the attention of the operator so that the latter may reverse the posting of the check and transmit the check with the necessary explanation to the proper bank official for appropriate action. The present machine is provided with means for detecting such occurrences and warning the operator thereof.

The slide 905 (FIG. 1) which, as in the machine of the Butler patent, is positioned by the stud 904 in accordance with the sign of the balance of the accumulated amounts contained in the A crossfooter for automatically conditioning the amount pinions of the crossfooter for positive or negative total-taking in accordance with the sign of the balance contained in the crossfooter, now carries in its lower end a stud 4425 which, when the slide 905 is in its lower or negative balance position, projects rightwardly in front of a lug 4426 on the lower end of the downward arm of a lever 4427 pivoted on a stud 4428 carried by the brace member 219. When the slide 905 and stud 904 are in their upward or positive balance positions, the stud 4425 is above the lug 4426 so as not to impede clockwise movement of the lever 4427. The forward arm of the lever 4427 carries a roller 4429 which is normally located in the path of the lower portion of the forward rounded end of the A crossfooter symbol indexing slide 589 which moves forwardly in each machine cycle prior to the 150° point and returns to normal subsequently to the 290° point. Thus, in each machine cycle the slide 589 depresses the roller 4429 to move the lug 4426 rearwardly of the stud 4425 prior to and holds the lug in such rearward position until after completion of operation of the front crossfooter tens-transfer mechanism in any machine cycle in which a negative balance could be produced in the crossfooter. Each time the roller 4429 is so depressed, a rightwardly bent projection 4430 on the forward arm of the lever 4427 closes a self-opening switch 4431 mounted on the brace member 219. If the balance in the crossfooter becomes or remains positive in the machine cycle, the stud 4425 is positioned above the lug 4426 as the slide 589 disengages from the roller 4429 so that a tension spring 4432 connected with the forward arm of the lever 4427 restores the latter to its normal limit against the stud 4425, permitting the switch 4431 to open. When, however, a negative balance occurs in the A crossfooter, the slide 904 is moved downwardly to position the stud 4425 in front of the lug 4426 to hold the lever 4427 in position to keep the switch 4431 closed after the slide 589 leaves the roller 4429.

Figure 3:
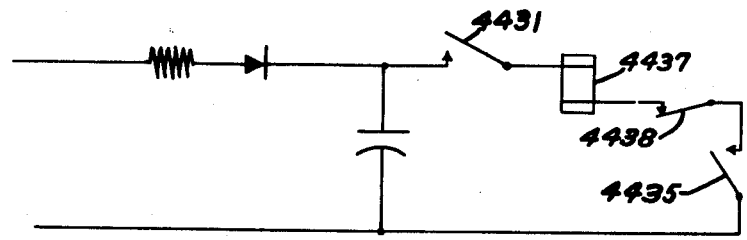
FIG. 3 is a circuit diagram of the overdraft warning means circuit.

A second self-opening switch 4435 (FIG. 2) is mounted on the front side of the rear frame plate 45 with its switch closing operating member in the path of a cam finger 4436 mounted rearwardly of the lane 25 position on that one of the bars 1750 of the function control program unit which carries the control projections 1767 for the deposit column position, the switch 4435 being so located that the cam finger 4436 closes it while and whenever the paper carriage is in the deposit columnar position. The switches 4431 and 4435, together with a self-closing and normally closed switch 4438 referred to hereinafter, are all connected, as shown in FIG. 3, in a series circuit with an electromagnet 4437 across the electrical power supply of the machine. A suitable rectifier and condenser may also be connected in the circuit, as shown in FIG. 3, to eliminate chattering of the electromagnet when the power supply is an A.C. supply, and a suitable current limiting resistor may also be included, as shown.

Figure 2:
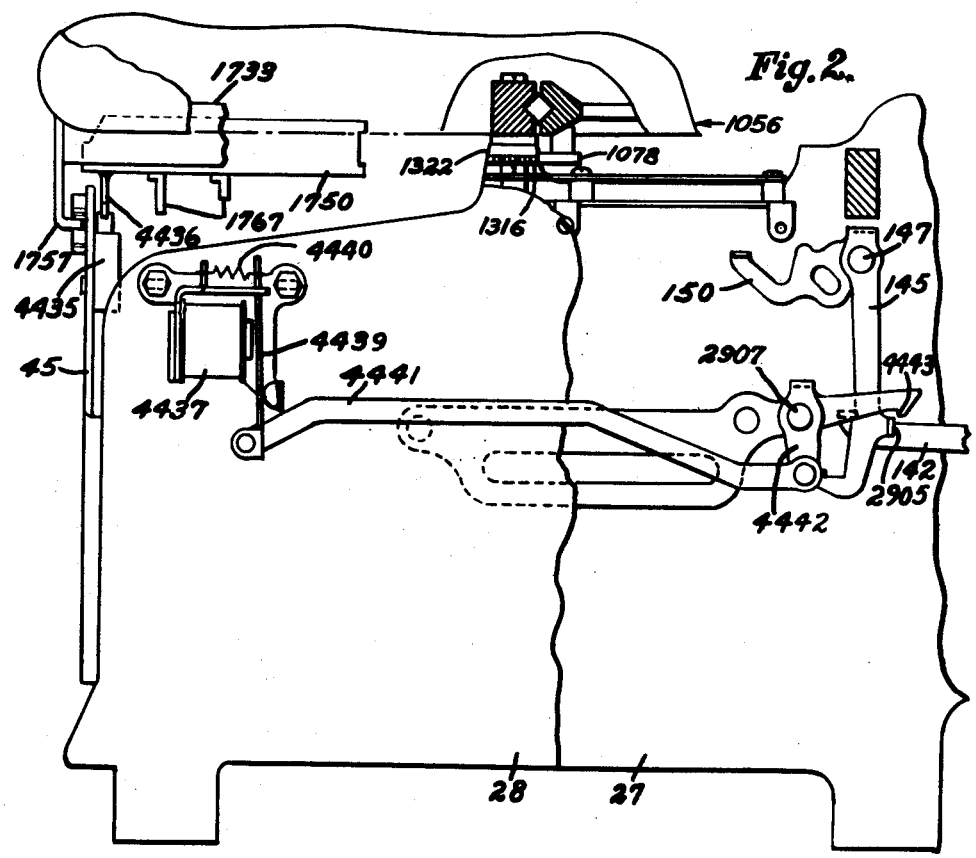
FIG. 2 is a left side elevation of other portions of the overdraft warning means.

As shown in FIG. 2, the magnet 4437, when energized, pulls an armature 4439 rearwardly against the tension of a restoring spring 4440. When the armature 4439 is pulled rearwardly it also pulls rearwardly a link 4441 pivotally connected at its rear end to the lower free end of the armature and pivotally connected at its forward end to the downward arm of a latch bell crank 4442 which is pivotally mounted on the stud 2907 and has a forward arm with a latch shoulder 4443 which is normally above the path of the lug 2905 on the machine cycling control lever 145, but is lowered to engage said lug to latch the lever 145 against cycle initiating movement when the link 4441 is pulled rearwardly by the energization of the electromagnet 4437 when the paper carriage moves into the deposit columnar position and closes the switch 4435 when an overdraft has occurred in a preceding check or debit entry columnar position and remains in the A crossfooter.

Thus, when the paper carriage moves to the deposit columnar position after the entry in a check entry columnar position of a check which produces an overdraft of an account, the operator will find that the machine cannot be operated in the normal way for entering a deposit. The operator may enter the amount of the deposit on the amount keys and may depress the balance bar or another motor bar to initiate a machine cycle, but because of the latching of the cycling control lever 145 by the latch bell crank 4442, 4443, the machine is locked in the deposit columnar position in advance of the new balance columnar position and will not cycle. The operator will then take note of the nature of the deposit item. If it is of an amount insufficient to cover the overdraft the operator will, of course, reverse the entry of the check causing the overdraft, and return that check in the usual way, as disclosed in the above-identified divisional application. Even if the amount of the deposit is sufficient to eliminate the overdraft but the deposit item is of a kind requiring collection, the operator, in accordance with the bank's rules, may also in that case reverse the entry of the check causing the overdraft and send that check and the deposit item with a suitable notation to the proper bank officer. If, however, the deposit item is one which, according to the bank's rules, may be drawn upon without delay, the operator may proceed to complete the posting in the manner next explained.

The previously mentioned self-closing and normally closed switch 4438 is mounted on the brace member 219 (FIG. 1). It is provided with an operating spring member 4445 engaged by a roller 4446 on the downward forward arm of a lever 4447 also pivotally supported on a stud 4448 secured in the brace member 219. The upper arm of the lever 4447 has a lateral projection bearing against a downward arm of a lever 4450 pivotally mounted on the end of the shaft 218. The lever 4450 has an upward arm connected to a tension spring 4451 which urges the lever 4450 clockwise to its normal position where its forward arm bears against the lower end of a stem of a release key 4452 guided in slots in the top and bottom plates 257 and 258 of the keyboard and by a guide strip 273, said release key 4452 being located just rightwardly of the B register total key 316. It will be apparent that depression of the release key 4452 will rock the lever 4450 counterclockwise against the tension of the spring 4451 to cam the lever 4447 clockwise so that the roller 4446 will operate the spring member 4445 to open the normally-closed switch 4438 by displacing the movable contact arm thereof from its normal circuit completing position in engagement with its back contact. It will be apparent from FIG. 3 that the opening of the switch 4438 by depression of the release key 4452 will deenergize the electromagnet 4437 which in turn will permit the spring 4440 (FIG. 2) to restore the armature 4439, link 4441, and latch bell crank 4442, 4443 to normal, thereby permitting the cycling control lever 145 to rock to cycle initiating position responsive to the depressed motor bar. As there is no latch member for the key 4452, it will be restored by the spring 4451 and lever 4450 immediately when finger pressure is removed therefrom. In the machine cycle so initiated, the deposit amount previously set on the keyboard will be entered in the machine in the usual way, so that if the deposit restores a positive total in the A crossfooter the posting may be completed in the normal manner.

From the foregoing it will also be apparent that control cam fingers 4436 may be provided for any columnar positions where it is desired to warn the operator of overdrafts, including the new balance position in place of or together with the negative total lock disclosed and claimed in the above-identified divisional application, which is effective only in a lane 18 controlled automatic second cycle following depression of the balance bar.

Modes of Operation

Figures 4, 5:
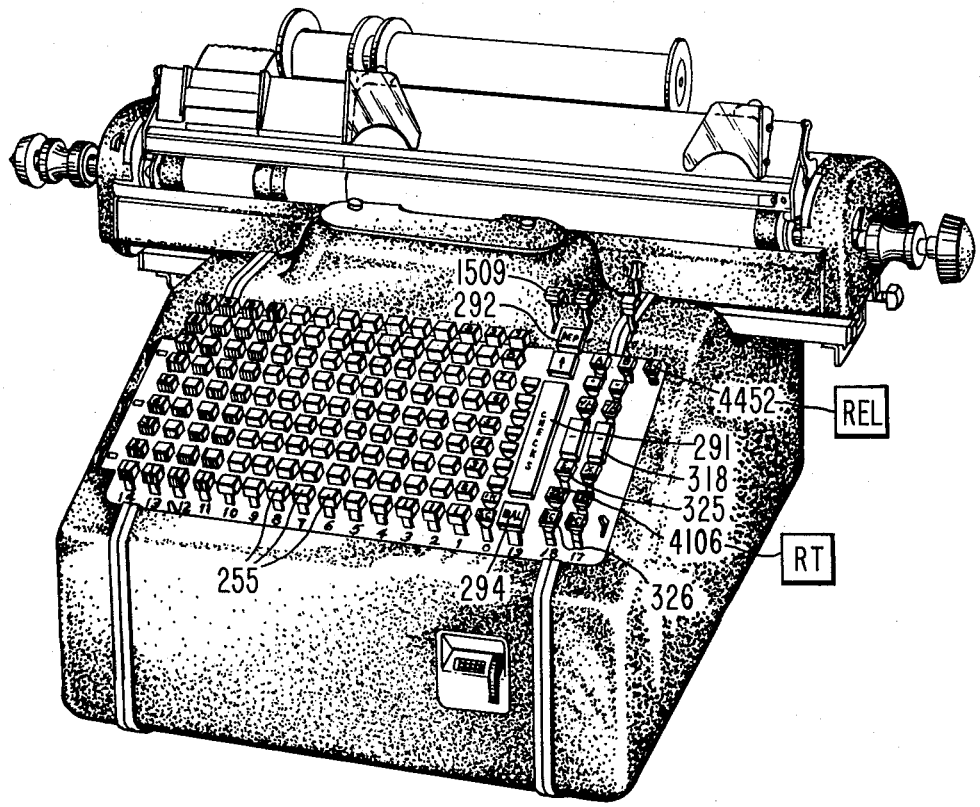
FIG. 4 is a perspective view of the external structure including the keyboard of an accounting machine in which the carriage controlled and negative balance overdraft warning means of the present invention may be embodied.
FIG. 5 is an illustrative work form of a sample posting operation that creates an overdraft which is detected by the overdraft warning means of the present invention.

Referring to FIGS. 4 and 5, let it be assumed that the operator is to post an account consisting of an old balance of $90.00, two checks, one for $25.00 and the other for $250.00, and a deposit item of $200.00. With the paper carriage in the (old balance) Pick-Up columnar position, the operator indexes the old balance of $90.00 in the amount keys 255 of the keyboard and depresses the Checks motor bar 291 to cycle the machine for the old balance pick-up operation and to tabulate the paper carriage to the first of two check entering columnar positions, the carriage tabulation occurring after the old balance amount is printed in the Pick-Up column of the ledger account card (not shown) overlying the journal sheet 4420 and is additively or positively entered into the A crossfooter or totalizer.

The operator then indexes the amount of the first check item, $25.00, in the keyboard and again depresses the Checks motor bar to cycle the machine for a debit entry operation and to tabulate the paper carriage to the second check columnar position after the amount of the first check is subtractively or negatively entered into the totalizer and is printed in the first check column position. The operator then indexes the amount of the second check in the keyboard and, since there is a deposit item following the second check which is the last check or debit item to be entered, the operator initiates the machine cycle for entering the $250.00 debit amount of the second check subtractively or negatively into the totalizer by depression of the Deposit motor bar 292, so that after the printing of the amount of the second check in the second check column position, the paper carriage tabulates to the deposit column in which the deposit or credit item is to be additively or positively entered into the totalizer in the ensuing, but not yet initiated, cycle of operation.

Then the operator indexes the $200.00 amount of the deposit item in the amount keys and, noting that there is no further item to be posted, depresses the Balance bar 294 of the machine. However, the machine does not cycle but remains in the deposit column position where it is now locked, thereby notifying the operator that at least one of the checks posted has produced an overdraft.

The operator will then consider the character of the deposit item. If it is found to be of a kind requiring collection, the operator will first restore the depressed motor bar 294 and the amount keys by depressing the error key 325, then depress the carriage tabulation key 1509 and return the paper carriage from the Deposit to the second Check columnar position, and re-enter in reversed sense the amount of the $250.00 check which caused the overdraft by indexing this amount in the keyboard, depressing the RT (Return Check) key 4106 and depressing the Balance bar 294. Depression of the Balance bar initiates the machine cycle in which the amount of returned check is symbol printed in the second check column of the journal and is reversely entered into the totalizer after which the paper carriage will skip tabulate to the new Balance position where, as the balance is now positive, the machine will automatically cycle for a positive total taking operation and print the positive balance of $65.00 in the new Balance column, all as disclosed in the above-identified divisional application. The operator will then forward the papers to the proper officer of the bank for a decision on whether or not to honor the check producing the overdraft also calling attention to the fact that the customer may be writing checks against uncollected and possibly non-existent deposit items. The account ledger may then be flagged with a suitable indication after subsequently posting thereon the uncollected deposit item as a temporary credit followed by a pencil or other notation that there is a $200.00 float item therein against which no checks or debit items, which reduce the amount of the balance below the float amount, are to be honored for the period required to collect the deposited check item.

If the character of the deposit had been such as to warrant the operator honoring the check which produced the temporary overdraft, the operator could have completed the posting by merely depressing the release key 4452 which would have opened the switch 4438 and deenergized the electromagnet 4437 to permit initiation of the machine cycle. The machine cycle would have been initiated immediately to complete the posting in the usual manner, inasmuch as the entry of the deposit amount would have restored the A crossfooter to positive total condition so that the negative total lock shown in FIG. 2 of the above identified divisional application would not interfere with the automatic balance operation with the paper carriage in the balance position.

It is believed that the foregoing example is sufficient to illustrate the advantages of the new control mechanisms of the present invention. It will, however, be readily appreciated by those skilled in the art that the disclosed machine may be used with advantage for a great variety of kinds of work and may be embodied in other equivalent forms in various accounting machines.

We claim:

1. Overdraft warning means for a cyclically operable accounting machine having drive control means operable to cause the machine to be driven through a cycle of operation, a carriage movable to any of a plurality of different columnar positions including an old balance pick-up amount entry position, a debit amount entry position, a credit amount entry position and a new balance total-taking position, and an adding and subtracting totalizer accumulating the amounts entered in the machine and in which the balance of the several amounts accumulated therein may be either positive or negative, the combination of a totalizer controlled switch settable in a control effective condition during an amount entry cycle of operation in which the accumulated balance in the totalizer becomes negative, a carriage controlled switch settable in a control effective condition when the carriage is in a predetermined one of said amount entry columnar positions, electrically operable means to prevent said drive control means from causing the machine to be driven through a cycle of operation, and circuit means controlled jointly by both said switches to activate said preventing means to prevent said drive control means from causing the machine to be driven through a subsequent amount entry cycle of operation immediately following an amount entry cycle of operation in which the accumulated balance in the totalizer becomes negative and the carriage is in said predetermined one of said amount entry columnar positions in advance of said new balance total-taking position.

2. Overdraft warning means according to claim 1 further having a third switch controlling said circuit means and a manipulative member to operate said third switch to condition said circuit means to disable said preventing means.

3. Overdraft warning means for a cyclically operable accounting machine including drive trip means operable to release the machine for a cycle of operation thereof, totalizer means in which amounts accumulated may be either positive or negative, a carriage movable to a plurality of different positions including an old balance pick-up amount entry position, a debit amount or check entry position in which amounts are entered into said totalizer subtractively, and a deposit amount entry position in which amounts are entered into said totalizer additively subsequent to the pick-up of the old balance amount and the subtractive entry of the debit amounts therefrom, and a new balance total-taking position, the combination of means controlled by said totalizer to occupy one position when the balance of the several amounts accumulated in the totalizer is positive and another position when the accumulated balance is negative, means operable to prevent said drive trip means from releasing the machine for a cycle of operation, switch means settable by said totalizer controlled means during a subtractive amount entry cycle of operation when the totalizer becomes negative, additional switch means settable by the movement of the carriage to said deposit amount entry carriage position in advance of said new balance total-taking position, and electrically operable means controlled jointly by both said settable switch means controlling operation of said drive trip preventing means when the balance in the totalizer is negative and the carriage is in said deposit amount entry position and preventing initiation of a deposit or additive amount entering cycle of operation of the accounting machine.

References Cited in the file of this patent
UNITED STATES PATENTS

| | | |
|---|---|---|
| 2,229,834 | Anderson | Jan. 28, 1941 |
| 2,813,611 | Frieberg et al. | Nov. 19, 1957 |
| 2,838,231 | Konrad et al. | June 10, 1958 |